UNITED STATES PATENT OFFICE 2,441,618

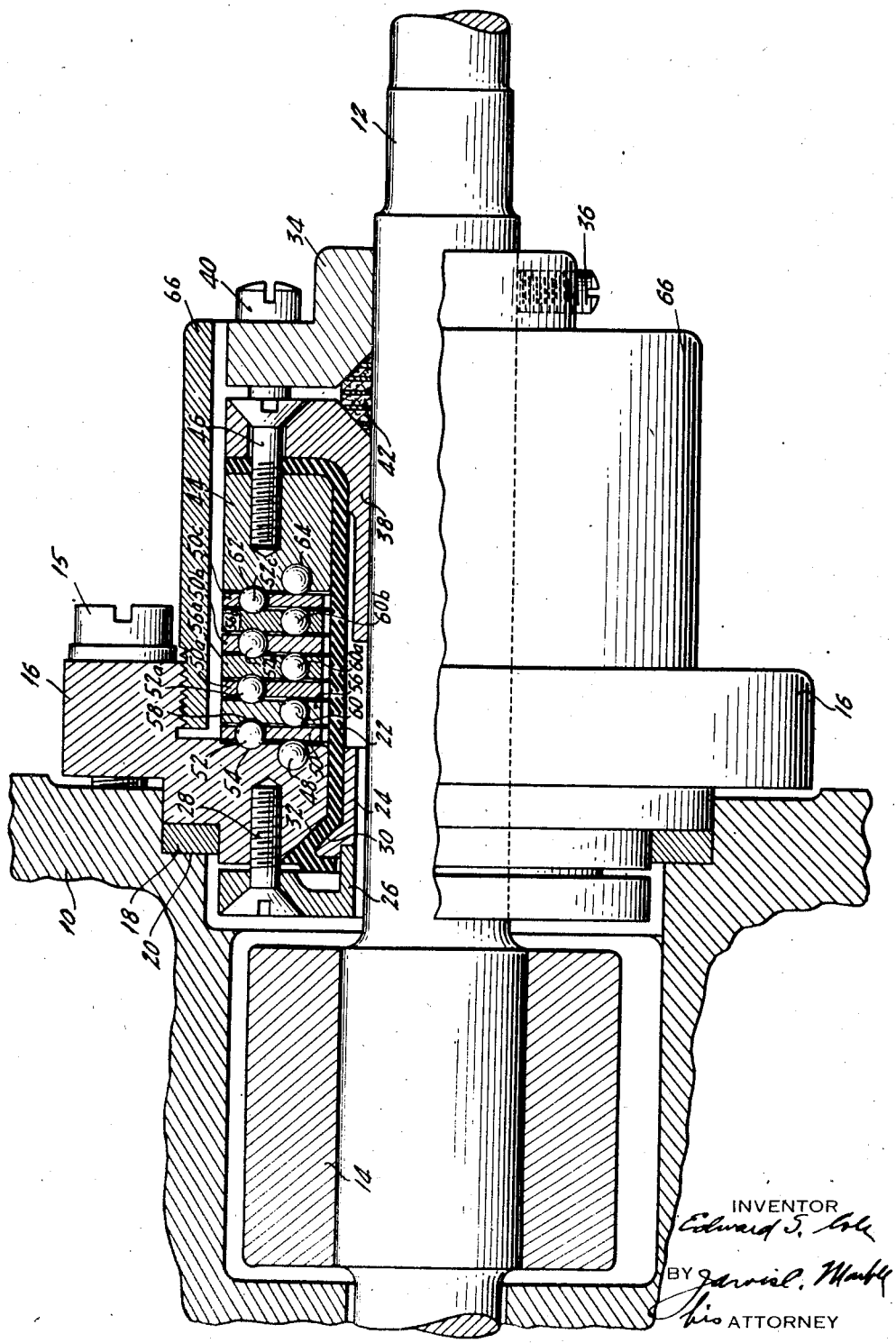

SHAFT SEAL

Edward S. Cole, Upper Montclair, N. J., assignor to Pitometer Log Corporation, New York, N. Y., a corporation of New York Application December 2, 1945, Serial No. 636,679

9 Claims. (Cl. 286—11)

My invention relates to a shaft seal for use with a shaft which is required to turn only a fraction of a revolution and more particularly to a seal capable of sustaining high fluid pressure.

In accordance with my invention a tubular flexible fluid-tight member, made for instance of rubber, is connected at one end to the shaft and at the opposite end to the wall of a housing or the like. Due to the flexible nature of the rubber one end is able to turn with the shaft while the other end is held stationary by the housing. However, when a seal of this nature is subjected to internal pressure, there is a tendency for the flexible material to expand and eventually burst. Attempts have been made to support the intermediate portions of the tube by rigid hollow members carried by the shaft or the wall of the housing and surrounding the flexible tubular member. However, when the flexible member is expanded by internal pressure against such supporting means, there results a large frictional resistance to turning which is frequently objectionable inasmuch as seals of this nature are often used in connection with indicating instruments which must be sensitive to relatively low torque.

In accordance with the present invention the flexible tubular member is supported by a plurality of closely spaced rings which are rotatably supported by means of ball bearings. Each ring is relatively narrow in axial extent and, inasmuch as it may freely turn with respect to adjacent rings, different rings may turn different amounts as the flexible tubular member is twisted and hence this member does not have any substantial sliding movement relative to the rings.

Another object of my invention is to provide a seal of this nature which may be readily removed as a unit from the shaft without requiring disassembly of the seal itself.

Further objects and advantages will be apparent from the following description considered in connection with the accompanying drawing, which forms a part of this specification, and of which the single figure is a cross-sectional view of a preferred embodiment of my invention.

Referring to the drawing, reference character 10 designates the wall of a housing having an opening through which extends a shaft 12. This shaft may be journalled in the housing wall by means of any suitable bearing, such as the sleeve bearing indicated at 14.

Suitably secured to the outer side of the wall 10, as by studs 15, is a gland 16, a packing ring 18 being interposed between the gland and an annular seat 20 formed in the wall. The inner diameter of the gland 16 is substantially larger than the outer diameter of the shaft at the point where the latter extends through the gland. A resilient tubular member 22 extends through the gland and is clamped in fluid-tight relation therewith by means of a clamping ring 24 which is urged to the right, as viewed in the figure, by means of a pressure ring 26 which is secured to the gland 16 by a plurality of bolts 28. As shown, the inner edge of the gland is bevelled at approximately 45°, while the clamping ring 24 is formed with a conical portion 30 which serves to clamp a similar conical portion 32 of the tube 22 against the bevelled edge of the gland.

A locking ring 34 is secured to the shaft 12, as by means of the setscrew 36. A flanged collar 38 is secured to the locking ring 34 by means of a plurality of bolts 40. Suitable packing 42 is provided between the bevelled surfaces on the ring 34 and the collar 38 so that, when these two parts are drawn together by means of the bolts 40, a fluid-tight seal is provided between the shaft and the collar 38.

The outer end of the flexible tubular member 22 is clamped in fluid-tight relation between the collar 38 and an annular member 44 by means of a plurality of bolts 46.

In view of the fact that the inner end of the tubular member 22 is secured in fluid-tight relation to the gland 16 and hence to the wall 10 of the housing, while the outer end of the tubular member is secured in similar relationship with the shaft, no leakage is possible from the interior of the housing, while the flexible nature of the tubular member permits limited turning of the shaft. However, in case the interior of the housing is subjected to fluid pressure higher than that existing outside the housing, this pressure would tend to expand the tubular member between the gland 16 and the ring 44, and if the difference in pressure were sufficient it would result in bursting of the tubular member. If this member were made strong enough to resist such bursting, it would be so stiff as to impose an undesirable high resistance to turning of the shaft. In order to provide suitable support for the intermediate portion of the tubular member, a plurality of relatively thin rings are disposed around the tubular member and between the gland 16 and the ring 44. As is shown in the drawing, the outer face of the gland is formed with an annular groove in which is received a ring of balls 48. After the balls have been introduced into this groove the edges of the latter are spun over so as to retain the ring of balls therein. An annular disc 50 is provided with a plurality of balls 52 retained in individual recesses in the disc. Any suitable number of recesses and balls may be provided, but in practice it has been found that six is a suitable number. The diameter of each ball 52 is greater than the thickness of the disc 50 and consequently the balls project beyond either side of the disc. The edges of the openings in the disc may be upset slightly so as to retain the balls therein to thus prevent their loss during assembly. The gland 16 is formed with an annular race 54 into which extend the balls 52. The balls 48 roll on the smooth flat surface of disc 50. Adjacent the disc 50 is a preferably slightly thicker disc 56 which is formed with a race 58 of the same diameter and depth as the race 54 in the gland 16. A plurality of balls 60 is received in peripherally spaced apertures formed in disc 56 in much the same manner as balls 52 in disc 50. However, due to the greater thickness of disc 56 the balls 60 project only slightly beyond the sides of the disc.

In the same manner additional discs 50a, 56a, 50b, 56b and 50c are provided. The inner face of ring 44 is provided with a race 62 which is engaged by the balls 52c. This ring is also formed with a groove for receiving a ring of balls 64, which are similar to the balls 48 in the gland 16.

From the above construction it will be seen that the balls 48 serve to space the disc 50 a predetermined distance axially from the gland 16, while the balls 52 which engage the race 54 serve to center the disc 50 with respect to the gland. The balls 52 also serve to space the disc 56 a predetermined distance from the gland and hence also a predetermined distance from the disc 50. These balls 52 furthermore serve to center the disc 56 by engaging the race 58. The balls 60 serve to space the discs 50 and 50a a predetermined distance apart and therefore serve to space the disc 50a a predetermined distance from the adjacent disc 56. In like manner the remaining discs are spaced from each other and centered with respect to each other and with respect to the ring 44, the balls 52c serving to center the disc 50c with respect to the ring 44 while the balls 64 serve to space the disc 50c a predetermined distance from the ring. It has been determined in practice that a clearance of .004" is suitable for the spacing of the discs. This is sufficiently close so that when the tubular member 22 is expanded against the inner surfaces of the discs, it cannot be extruded into the spaces between them and is supported in substantially the same manner as though the rings constituted a solid rigid tube. Due to the ball bearings each disc may turn relative to adjacent discs with a minimum of friction. Hence, when the tubular member 22 is expanded against the discs and the shaft 12 turns, thus causing the outer end of the tubular member to turn with the shaft while the inner end is held stationary, each disc may turn through the same angle that the portion of the tubular member which is in contact therewith turns. In other words, the outermost disc 50c will turn through practically the same angle as the shaft turns, while the innermost disc 50 will remain practically stationary and the intermediate discs will turn varying amounts. In this way practically all sliding friction between the tubular members and the discs is eliminated, while still providing a substantially rigid support in radial direction for the tubular member.

It will be seen that the balls carried by a disc do not directly serve to space such disc axially with respect to adjacent discs but serve to space discs on either side thereof from each other. In other words, alternate discs are spaced by balls carried by an intermediate disc. Thus, the discs 50 and 50a, 50a and 50b, and 50b and 50c are spaced from each other by balls 60, 60a, and 60b, respectively, while discs 56 and 56a, and 56a and 56b are spaced from each other by balls 52a and 52b, respectively. Because of this construction, the unavoidable play between a disc and the balls carried thereby has no effect on the axial clearance between adjacent discs. It also permits the use of discs thinner than the diameter of the balls, which is highly advantageous inasmuch as the thinner the discs, the less is the relative turning between any disc and the portion of the tubular member supported thereby.

If desired, a protective sleeve 66 may be threaded into the gland 16 so as to substantially cover the seal to protect it from accidental injury and to minimize the introduction of dirt into the ball bearings.

In order to remove the seal and replace it with another it is only necessary to remove the bolts which secure the bland 16 to the housing and loosen the setscrew 36 and the bolts 40. Thereupon the entire seal assembly may be removed from the shaft and replaced by another without in any manner disassembling the seal itself.

While I have shown one preferred embodiment of my invention, it is to be understood that this has been done for purposes of illustration only and that the scope of my invention is not to be limited thereby, but is to be determined from the appended claims.

What is claimed:

1. In a seal between a wall and a shaft extending therethrough, a flexibly tubular member, means for securing one end of said member to the wall and the other end to the shaft, a plurality of annular discs surrounding said tubular member, and bearing balls carried by alternate discs and engaging annular ball races in intermediate adjacent discs for axially spacing the discs and centering the discs with respect to each other.

2. In a seal between a wall and a shaft extending therethrough, a flexibly tubular member, means for securing one end of said member to the wall and the other end to the shaft, a plurality of annular discs surrounding said tubular member, bearing balls carried by each disc for axially spacing discs on either side thereof from each other, and annular ball races formed on both sides of alternate discs for engagement with balls carried by intermediate discs for centering all of the discs with respect to each other.

3. In a seal between a wall and a shaft extending therethrough, a flexibly tubular member, means for securing one end of said member to the wall and the other end to the shaft, a plurality of annular discs surrounding said tubular member, and bearing balls rotatably mounted in openings in each disc and projecting axially beyond the disc for contacting and spacing discs on either side thereof from each other, the balls in alternate discs being located on a different radius than the balls in intermediate discs.

4. In a seal between a wall and a shaft extending therethrough, a flexibly tubular member, means for securing one end of said member to the wall and the other end to the shaft, a plurality of annular discs surrounding said tubular member, and bearing balls rotatably mounted in openings in each disc and projecting axially beyond the disc for contacting and spacing discs on either side thereof from each other, the balls in alternate discs being located on a different radius than the balls in intermediate discs, alternate discs being thicker than intermediate discs and being formed with annular ball races on either side thereof for engagement with balls carried by intermediate discs for centering all of the discs with respect to each other.

5. In a seal between a wall and a shaft extending therethrough, a gland secured in fluid-tight relation to the wall, a ring secured in fluid-tight relation to the shaft and spaced axially from the gland, a flexible tubular member surrounding said shaft, means for securing one end of said member in fluid-tight relation to the gland and the other end to the ring, a series of annular discs surrounding said tubular member between said gland and said ring, a plurality of bearing walls retained in a race in said gland and contacting one of the end discs of said series, a plurality of bearing balls retained in a race in said ring and contacting the other end disc of said series, and bearing balls carried by each disc for axially spacing discs on either side thereof from each other.

6. In a seal between a wall and a shaft extending therethrough, a gland secured in fluid-tight relation to the wall, a ring secured in fluid-tight relation to the shaft and spaced axially from the gland, a flexible tubular member surrounding said shaft, means for securing one end of said member in fluid-tight relation to the gland and the other end to the ring, a series of annular discs surrounding said tubular member between said gland and said ring, a plurality of bearing balls retained in a race in said gland and contacting one of the end discs of said series, a plurality of bearing balls retained in a race in said ring and contacting the other end disc of said series, bearing balls carried by each disc for axially spacing discs on either side thereof from each other, and annular ball races formed on both sides of alternate discs and on said gland and ring for engagement with balls carried by intermediate discs for centering all of the discs with respect to each other and to said gland and to said ring.

7. In a seal between a wall and a shaft extending therethrough, a gland secured in fluid-tight relation to the wall, a ring secured in fluid-tight relation to the shaft and spaced axially from the gland, a flexible tubular member surrounding said shaft, means for securing one end of said member in fluid-tight relation to the gland and the other end to the ring, a series of annular discs surrounding said tubular member between said gland and said ring, a plurality of bearing balls retained in a race in said gland and contacting one of the end discs of said series, a plurality of bearing balls retained in a race in said ring and contacting the other end disc of said series, and bearing balls rotatably retained in openings in each disc and projecting axially beyond the disc for contacting discs on either side thereof, the balls in alternate discs being located on a different radius than the balls in intermediate discs.

8. In a seal between a wall and a shaft extending therethrough, a gland secured in fluid-tight relation to the wall, a ring secured in fluid-tight relation to the shaft and spaced axially from the gland, a flexible tubular member surrounding said shaft, means for securing one end of said member in fluid-tight relation to the gland and the other end to the ring, a series of annular discs surrounding said tubular member between said gland and said ring, a plurality of bearing balls retained in a race in said gland and contacting one of the end discs of said series, a plurality of bearing balls retained in a race in said ring and contacting the other end disc of said series, and bearing balls rotatably retained in openings in each disc and projecting axially beyond the disc for contacting discs on either side thereof, the balls in alternate discs being located on a different radius than the balls in intermediate discs, alternate discs being thicker than intermediate discs and annular ball races formed on both sides of said alternate discs and on said gland and ring for engagement with balls carried by intermediate discs for centering all of the discs with respect to each other and to said gland and to said ring.

9. In a seal between a wall and a shaft extending therethrough, a gland secured in fluid-tight relation to the wall, a ring secured in fluid-tight relation to the shaft and spaced axially from the gland, a flexible tubular member surrounding said shaft, means for securing one end of said member in fluid-tight relation to the gland and the other end to the ring, a series of annular discs surrounding said tubular member between said gland and said ring, a plurality of bearing balls retained in a race in said gland and contacting one of the end discs of said series, a plurality of bearing balls retained in a race in said ring and contacting the other end disc of said series, bearing balls carried by each disc for axially spacing discs on either side thereof from each other, and a protective sleeve removably secured to said gland and surrounding said discs in spaced relation therewith.

EDWARD S. COLE.

REFERENCES CITED

The following references are of record in the file of this patent:

UNITED STATES PATENTS

| Number | Name | Date |
| --- | --- | --- |
| 1,272,178 | Anderson | July 9, 1918 |
| 1,769,933 | Arutunoff | July 8, 1930 |